(12) United States Patent
Avery

(10) Patent No.: US 10,470,384 B1
(45) Date of Patent: Nov. 12, 2019

(54) AGRICULTURAL APPARATUS

(71) Applicant: Donald J. Avery, Bonita Springs, FL (US)

(72) Inventor: Donald J. Avery, Bonita Springs, FL (US)

( * ) Notice: Subject to any disclaimer, the term of this patent is extended or adjusted under 35 U.S.C. 154(b) by 0 days.

(21) Appl. No.: 16/173,841

(22) Filed: Oct. 29, 2018

Related U.S. Application Data

(60) Provisional application No. 62/618,130, filed on Jan. 17, 2018.

(51) Int. Cl.
*A01G 31/02* (2006.01)
*A01G 31/06* (2006.01)
*A01G 9/14* (2006.01)

(52) U.S. Cl.
CPC ............... *A01G 31/06* (2013.01); *A01G 9/14* (2013.01)

(58) Field of Classification Search
CPC ........ A01G 31/02; A01G 31/06; A01G 9/022; A01G 9/023; A01G 9/024; A47G 7/04; A47G 7/041; A47G 7/072
See application file for complete search history.

(56) References Cited

U.S. PATENT DOCUMENTS

| | | | |
|---|---|---|---|
| 1,983,806 A * | 12/1934 | Norman | A01G 9/1423 47/18 |
| 3,314,192 A | 4/1967 | Park | |
| 3,772,827 A * | 11/1973 | Ware | A01G 9/022 47/39 |
| 3,909,978 A | 10/1975 | Fleming | |
| 4,068,405 A | 1/1978 | Campbell et al. | |
| 4,163,342 A | 8/1979 | Fogg et al. | |
| 4,276,720 A * | 7/1981 | Lyon | A01G 27/04 47/14 |
| 4,514,929 A | 5/1985 | Lestraden | |
| 4,713,909 A | 12/1987 | Roper et al. | |
| 5,042,196 A | 8/1991 | Lukawski | |
| 5,584,141 A * | 12/1996 | Johnson | A01G 9/00 47/39 |
| 5,943,818 A | 8/1999 | Fruewirth | |
| 6,279,263 B1 | 8/2001 | Lai | |
| 6,598,339 B1 | 7/2003 | Bish et al. | |
| 7,415,796 B2 | 8/2008 | Brusatore | |
| 7,533,493 B2 | 5/2009 | Brusatore | |
| 7,549,250 B2 | 6/2009 | Feuz | |
| 7,818,917 B2 | 10/2010 | Brusatore | |
| 8,132,366 B1 * | 3/2012 | LeBlanc | A01G 9/024 211/124 |
| 8,151,517 B2 | 4/2012 | Emoto | |
| 8,250,808 B2 | 8/2012 | Kania et al. | |
| 9,010,022 B2 * | 4/2015 | Brusatore | A01G 31/06 47/62 A |
| 2006/0055289 A1 * | 3/2006 | Wu | A47B 47/0016 312/6 |

(Continued)

FOREIGN PATENT DOCUMENTS

| | | |
|---|---|---|
| CN | 102381450 | 3/2012 |
| WO | WO/2013108620 | 7/2013 |

*Primary Examiner* — Trinh T Nguyen
(74) *Attorney, Agent, or Firm* — Edward M. Livingston, Esq.; Bryan L. Loeffler, Esq.; Livingston Loeffler, P.A.

(57) ABSTRACT

An agricultural apparatus (1) that provides a system of vessels (2) arranged vertically for growing plants that allows crops to be grown in confined areas and in geographic areas where crops cannot normally be grown on various planet surfaces.

21 Claims, 6 Drawing Sheets

(56) References Cited

U.S. PATENT DOCUMENTS

2016/0324089 A1* 11/2016 Miyabe ............... A01C 21/005
2016/0338276 A1    11/2016 Speidell et al.
2017/0055471 A1     3/2017 Ng

* cited by examiner

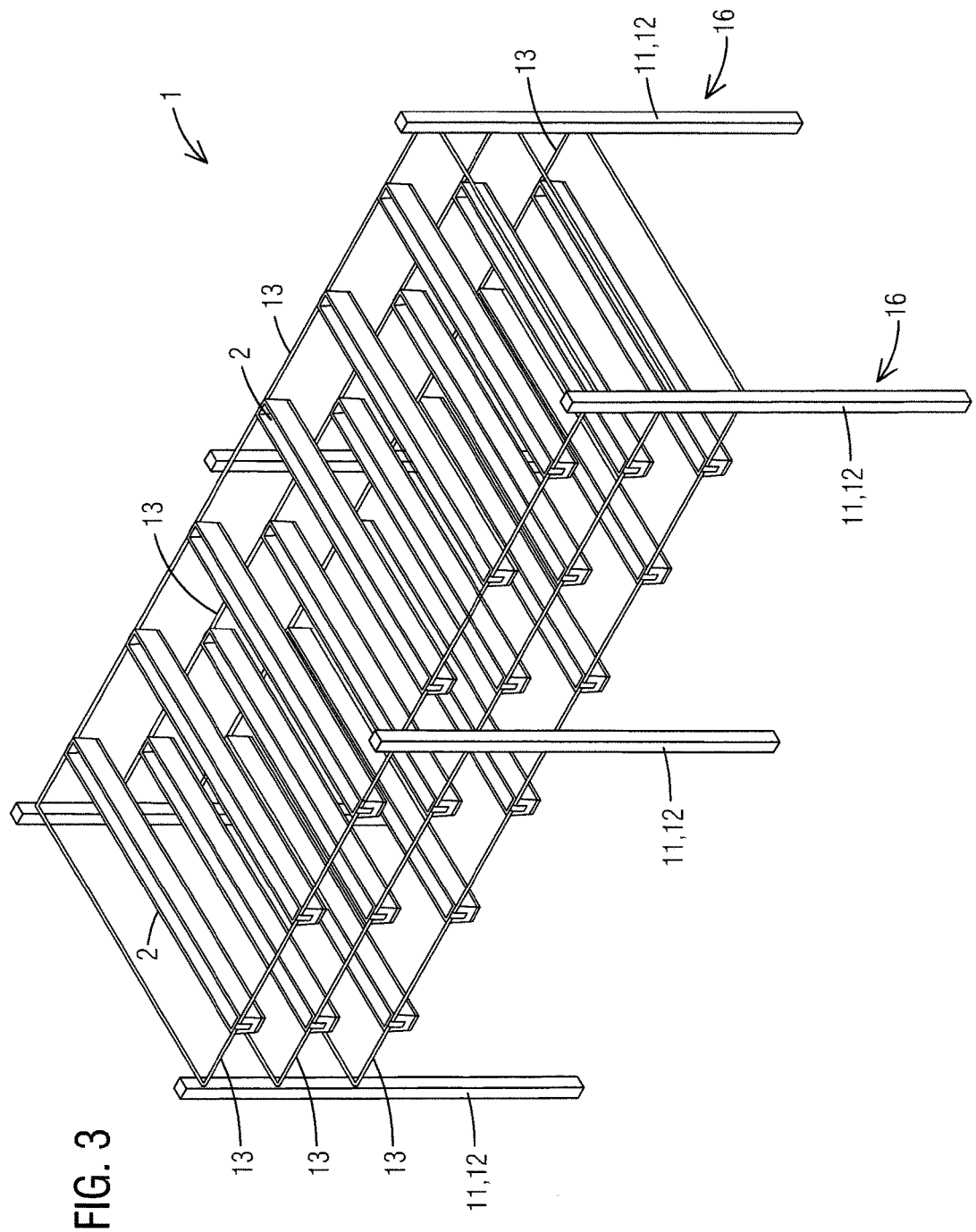

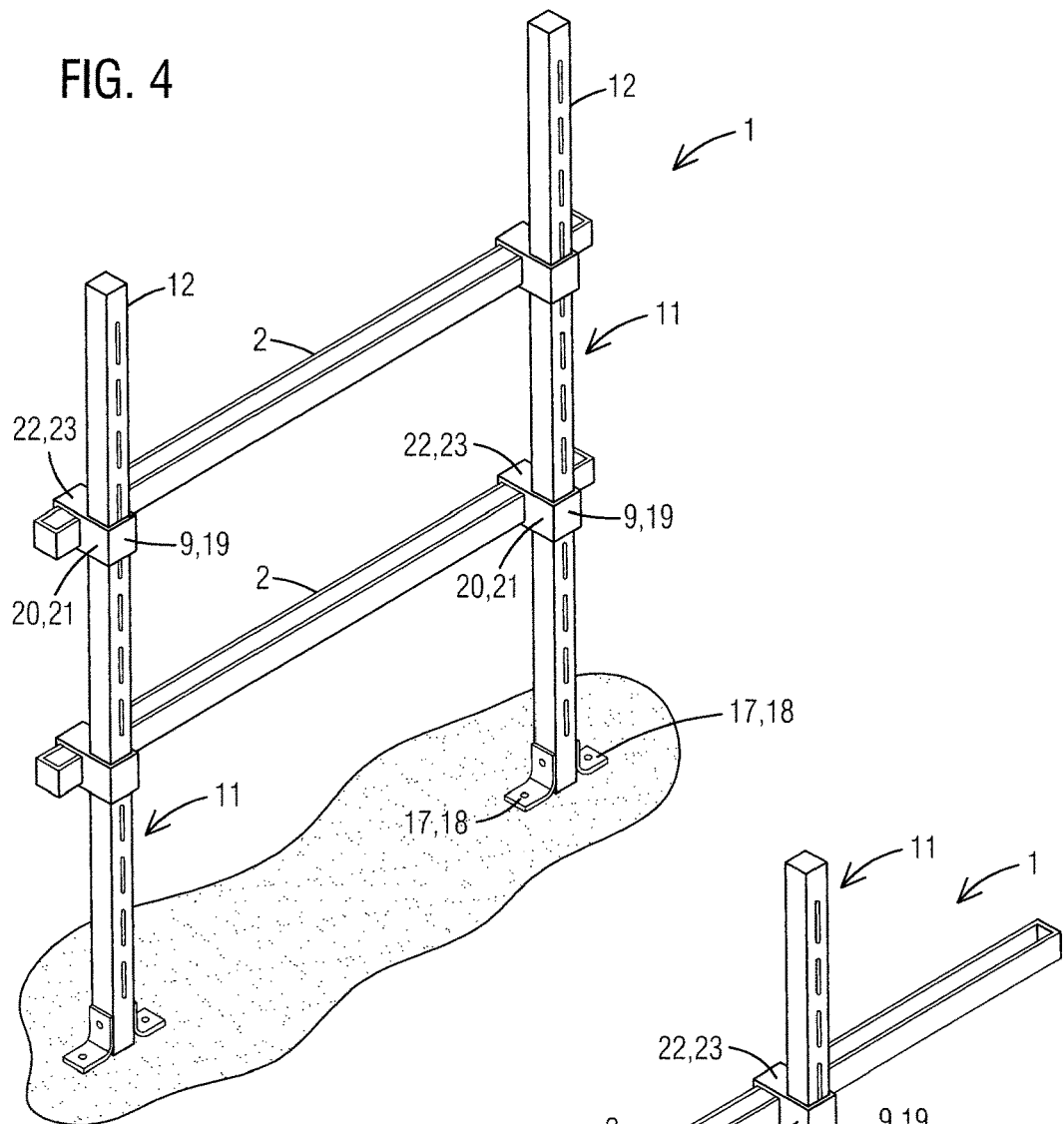
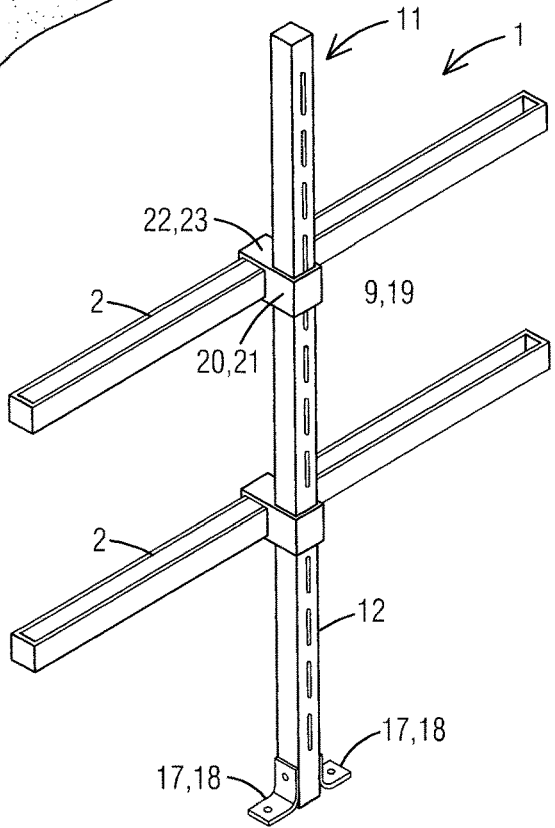

AGRICULTURAL APPARATUS

FIELD OF THE INVENTION

This invention relates to agricultural devices for growing plants and more particularly a free standing system of vertically arranged vessels used to grow plants on all plant surfaces.

BACKGROUND OF THE INVENTION

Farmland is becoming scarce due to over-development, contamination and environmental issues. Meanwhile, the demand for food is becoming greater every year due to an increasing population.

This has resulted in higher food prices and food shortages, especially in areas where land is at a premium and/or available land is not usable for crop production.

Therefore, a need exists for an agricultural apparatus that provides a system of vessels arranged vertically for growing plants that allows crops to be grown in confined areas and in geographic areas where crops cannot normally be grown on various planet surfaces.

SUMMARY OF THE INVENTION

The primary object of the present invention is to provide an agricultural apparatus that provides a system of vessels arranged vertically for growing plants on all planet surfaces that allows crops to be grown in confined areas and in geographic areas where crops cannot normally be grown on various planet surfaces.

An additional object of the present invention is to provide an agricultural apparatus that improves photosynthesis and reduces damage caused by intense direct midday sunlight.

An additional object of the present invention is to provide an agricultural apparatus having a floating base, thereby allowing the apparatus to be constructed and used on open water, ponds, lakes, swamps, marshes and so forth.

An additional object of the present invention is to provide an agricultural apparatus that reduces and/or eliminates soil erosion, runoff of pesticides, runoff of fertilizers and runoff of other soil and water contaminates.

An additional object of the present invention is to provide an agricultural apparatus that provides a physical barrier to birds, animals, insects and other creatures.

The present invention fulfills the above and other objects by providing an agricultural apparatus that provides a system of vertical shelves and/or vessels used for growing plants on all planet surfaces, in confined areas and in geographic areas where crops cannot normally be grown in sandy, arid, salty soil, rocky and lava surfaces, water, swamps, marshes and so forth. The agricultural apparatus of the present invention is a free standing arrangement support structure made up of vertical supports and horizontal supports that may be arranged in a variety of configurations depending on the available space. The support structure may be secured to the ground or have a base that holds the support structure in an upright position. The base may be a floating base to allow the agricultural apparatus to be used on water, in swamps, in marshes or in other liquid entities.

The agricultural apparatus may have a reflective roof cover to shade the plants and prevent extreme sunlight form the midday sun from slowing down photosynthesis occurring in the plants as photosynthesis is the most under utilized important health and environmental element effecting humanity on the planet.

This deficiency can be corrected by an above all planet surfaces plant growth system.

In addition, the agricultural apparatus may have an exterior cover, such as a mesh or screen, to protect the plants from animals and/or insects.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 3 is a perspective top view of an agricultural apparatus having a plurality of vessels supported by a support structure having vertical supports and horizontal supports;

FIG. 4 is a side perspective view of a support structure of the present invention wherein vessels are supported by multiple vertical supports;

FIG. 5 is a side perspective view of a support structure of the present invention wherein vessels are directly supported by a vertical support;

DESCRIPTION OF THE PREFERRED EMBODIMENTS

Figure 1:
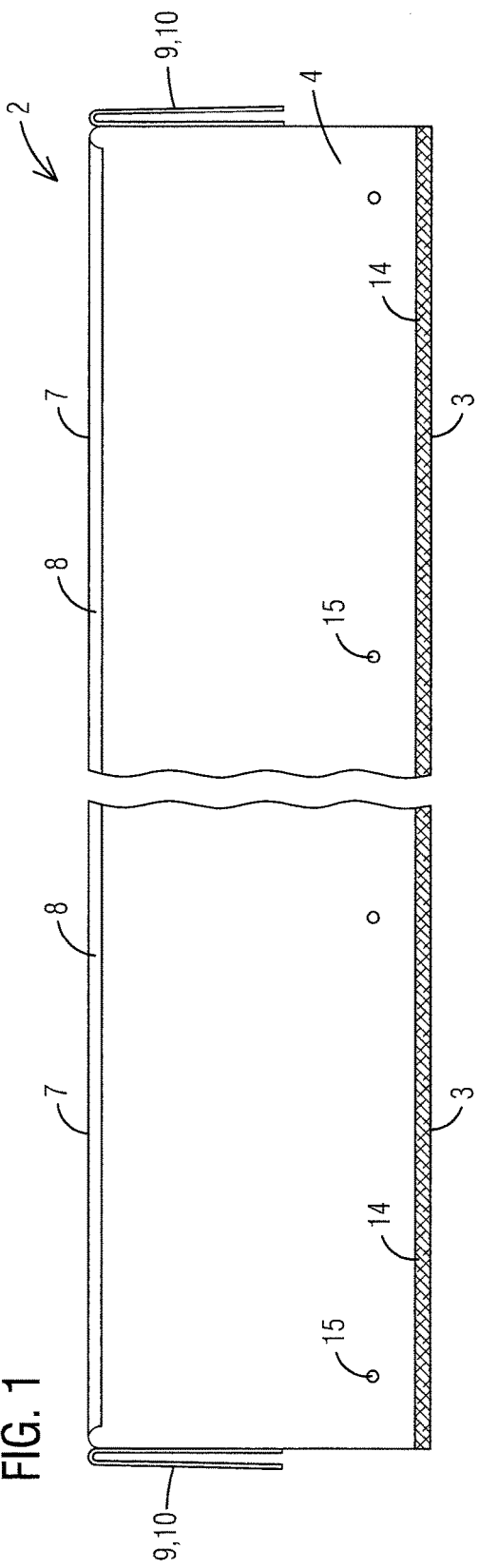
FIG. 1 is a front view of a vessel from an agricultural apparatus of the present invention.
Figure 2:
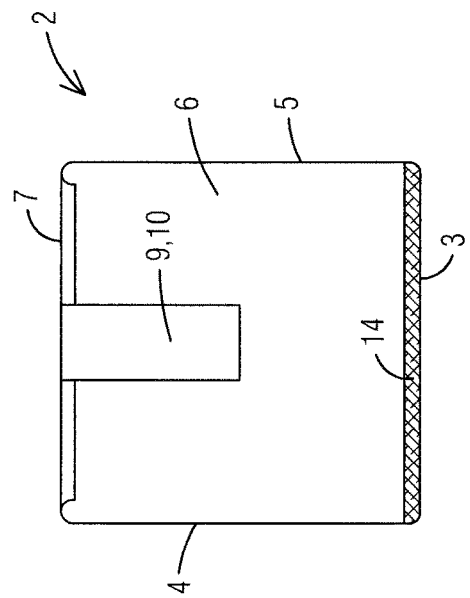
FIG. 2 is an end view of a vessel from an agricultural apparatus of the present invention.

For purposes of describing the preferred embodiment, the terminology used in reference to the numbered accessories in the drawings is as follows:

1. agricultural apparatus, generally
2. vessel
3. bottom panel of vessel
4. front panel of vessel
5. rear panel of vessel
6. side panel of vessel
7. upper perimeter edge of vessel
8. lip
9. attachment means
10. clip
11. support structure
12. vertical support
13. horizontal support
14. liquid absorbent layer
15. vent hole
16. parallel row
17. base
18. anchoring bracket
19. support bracket
20. first half of support bracket
21. vertical tube of support bracket
22. second half of support bracket 23. horizontal tube of support bracket
24. roof cover
25. stake
26. floating base
27. exterior cover
28. exterior support frame With reference to FIGS. 1 and 2, a front view and end view, respectively, of a vessel 2 from an agricultural apparatus 1 of the present invention is illustrated. The vessel 2 is used to hold a substrate, such as dirt, and one or more plants. The vessel 2 is substantially rectangular-shaped and comprises a bottom panel 3, front panel 4, rear panel 5 and side panels 6. An upper perimeter edge 7 of the vessel may be folded or curled to provide a lip 8. One or more attachment means 9, such as clips 10, are located on the vessel 2 and are used to attach the vessel 2 to a support structure 11, as illustrated in FIG. 3. As illustrated herein, the clips 10 are located on the side panels 6 and extend from the upper perimeter edge 7 of the side panels 6 in an L-shaped fashion, thereby allowing the clips 10 to be placed over a horizontal support 13, as illustrated in FIG. 3. However, attachment means 9, such as clips 10, may be located on front panel 4, rear panel 5 and/or side panels 6.

A liquid absorbent layer 14 is located on an inner surface of the bottom panel 3 of the vessel 2 to absorb and retain moisture for the plants contained within the vessel 2. One or more vent holes 15 may be located on the front panel 4, rear panel 5 and/or side panels 6.

With reference to FIG. 3, a perspective top view of an agricultural apparatus 1 having a plurality of vessels 2 supported by a support structure 11 having elongated vertical supports 12 and elongated horizontal supports 13 is illustrated. The support structure 11 comprises a plurality of vertical supports 12 supporting a plurality of horizontal supports 13. The vertical supports 12 and the horizontal supports 13 may be adjustable lengthwise to allow the support structure 11 to be made larger or smaller. The horizontal supports 13 are spaced apart at various heights on the vertical supports 12 to create a shelf system. As illustrated herein, the vertical supports 12 are arranged in two parallel rows 16 wherein the horizontal supports 13 span the distances between the vertical supports 12 contained in each parallel row 16. A plurality of vessels 2 are located between the parallel rows 16 wherein attachment means 9, such as clips 10, engage the horizontal supports 13. The vessels 2 may then be spaced apart horizontally and vertically within the support structure 11 to create a stacked configuration of vessels 2, thereby allowing numerous plants to be grown within the foot print of the support structure 11.

With reference to FIG. 4, a side perspective view of a support structure 11 of the present invention wherein vessels 2 are directly supported by multiple vertical supports 12 is illustrated. As illustrated herein, the support structure 11 comprises at least one vertical support 12, which may be tubular-shaped for strength. The support structure 11 may be secured to the ground via a base 17, such as anchoring brackets 18, stakes, spikes, foundational supports, weights, feet, and so forth, which stabilize the support structure 11 in an upright position. The support structure 11 may be placed on a variety of surfaces, such as hard surfaces, dirt, swamp, marsh, water and so forth. As illustrated in FIG. 4, the support structure 11 comprises a plurality of anchoring brackets 18 that are L-shaped.

Vessels 2 span the lengths between two vertical supports 12 creating an H-shaped configuration. The vessels 2 are secured to the vertical supports 12 via an attachment means 9, such as support brackets 19. The support brackets 19 illustrated herein comprise two halves wherein a first half 20 is a vertical tube 21 and the second half 22 is a horizontal tube 23 integral to each other. The vertical tube 21 is placed over the vertical support 11 and the horizontal tube 23 is placed over the vessel 2. A plurality of vessels 2 may be spaced apart height wise on the at least one vertical support 12 to create stacked levels of vessels 2.

With reference to FIG. 5, a side perspective view of a support structure 11 of the present invention wherein vessels 2 are directly supported by a vertical support 12 is illustrated. The vessels 2 may be supported by a single vertical support 12, thereby creating a T-shaped configuration. Each vessel 2 is secured to the vertical support 12 via an attachment means 9, such as support brackets 19.

Figure 6:
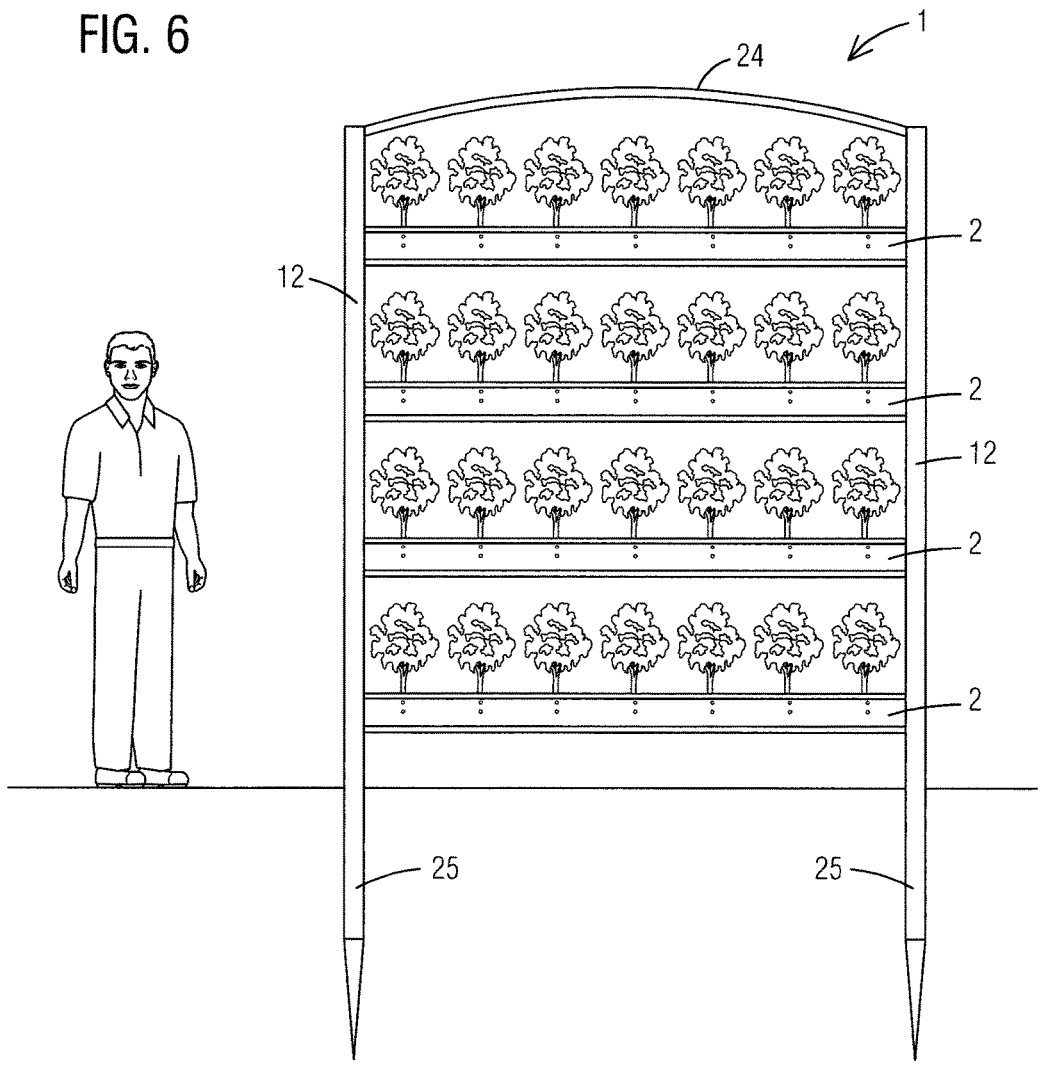
FIG. 6 is a side view of an agricultural apparatus of the present invention in use and anchored using stakes.

With reference to FIG. 6, a side view of an agricultural apparatus 1 of the present invention in use is illustrated. Vessels 2 span the lengths between two vertical supports 12 creating an H-shaped configuration. A plurality of vessels 2 may be spaced apart height wise on the vertical supports 12 to create stacked levels or shelves of vessels 2.

A roof cover 24 is supported by the vertical supports 12 to protect the plants contained within the vessels 2 from direct sunlight. The support structure 11 is secured to the ground via a base 15, such as one or more stakes 25.

Figure 7:
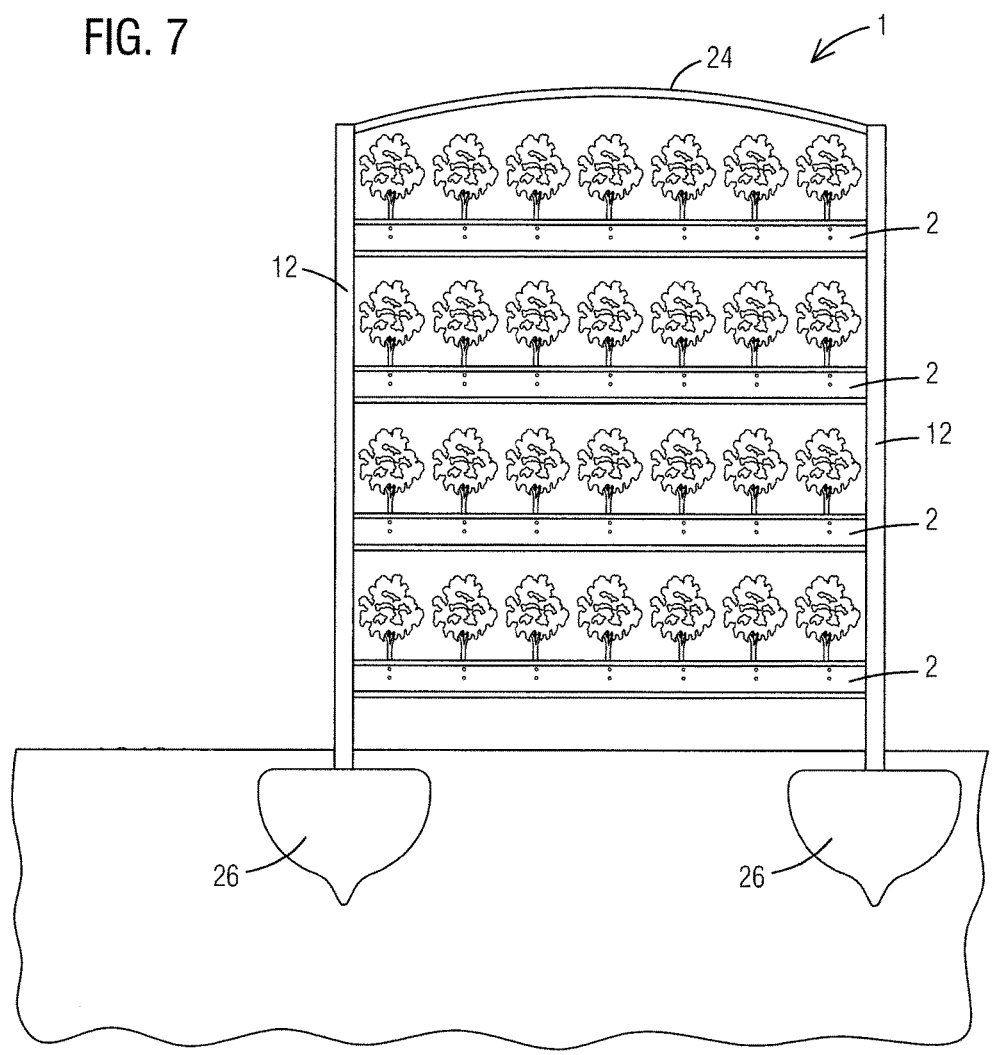
FIG. 7 is a side view of an agricultural apparatus of the present invention in use and supported by a floating base.

With reference to FIG. 7, a side view of an agricultural apparatus 1 of the present invention in use is illustrated. Vessels 2 span the lengths between two vertical supports 12 creating an H-shaped configuration. A plurality of vessels 2 may be spaced apart height wise on the vertical supports 12 to create stacked levels or shelves of vessels 2.

A roof cover 24 is supported by the vertical supports 12 to protect the plants contained within the vessels 2 from direct sunlight. The support structure 11 is secured to a floating base 26 that allows the agricultural apparatus 1 to be used on water or in swaps or marshes where stable land is not available for growing crops and/or supporting the agricultural apparatus 1 using normal anchoring means.

Figure 8:
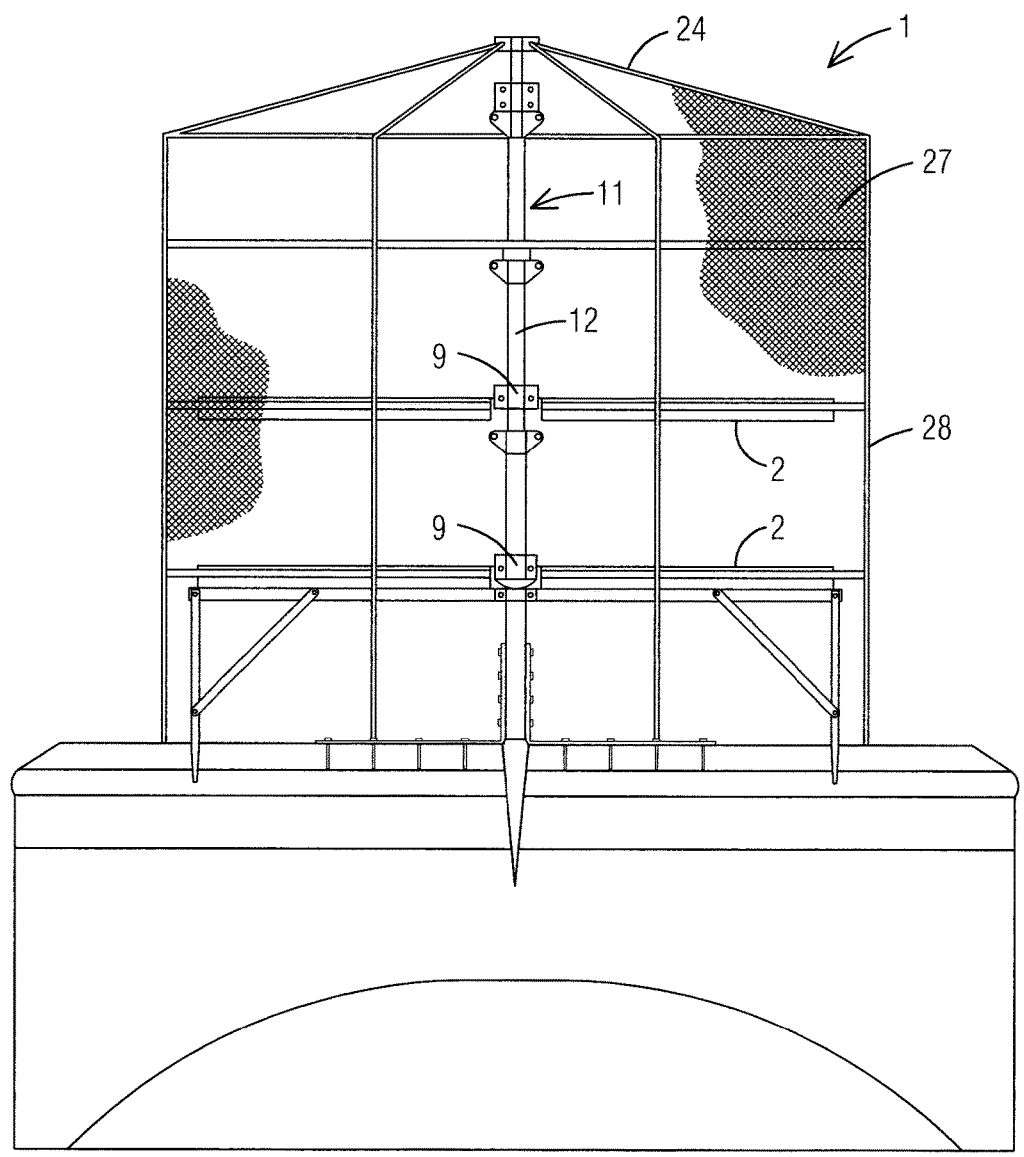
FIG. 8 is a side view of an agricultural apparatus having a plurality of vessels arranged around a vertical support in a circular configuration.

With reference to FIG. 8, a side view of an agricultural apparatus 1 having a plurality of vessels 2 arranged around a vertical support 12 in a circular configuration is illustrated. The vertical support 12 is placed centrally and supports a plurality of vessels 2 that are each attached to the central support via attachment means 9. The vessels 2 extend outward from the central vertical support 12 at angles in relation to each other. The support structure 11 and vessels 2 may be covered by a roof cover 24 to protect the contents of the vessels 2 from overexposure to sunlight and/or an exterior cover 27 to protect the contents of the vessels 2 from animals, insects and so forth. The exterior cover 27 may comprises, screen, mesh or equivalent material that allows air and sunlight through but prevents entry of animals and/or insects. The exterior cover may be supported by the roof cover 24 and/or supported by an exterior support frame 28 which may be reflective. The support structure 11 and/or components thereof may be rotatable.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. An agricultural apparatus for growing plants comprising:
    a support structure having at least one elongated vertical support extending upward from a base;
    a plurality of vessels secured to the support structure via attachment means;
    said plurality of vessels being spaced apart vertically on the support structure;
    each of said plurality of vessels is substantially rectangular-shaped and comprises a bottom panel, front panel, rear panel and side panels;
    each of said plurality of vessels is supported by the at least one vertical support;
    said attachment means attaching said plurality of vessels to said at least one vertical support comprises at least one attachment bracket; and
    said at least one support bracket comprises two halves wherein a first half is a vertical tube and the second half is a horizontal tube wherein the vertical tube is placed over the at least one vertical support and the horizontal tube is placed over a vessel being attached to the at least one vertical support.

2. The agricultural apparatus of claim 1 further comprising:
    a plurality of horizontal supports spaced apart at various heights on the at least one vertical support of the support structure.

3. The agricultural apparatus of claim 2 wherein:
    each of said plurality of vessels is substantially rectangular-shaped and comprises a bottom panel, front panel, rear panel and side panels; and
    each of said plurality of vessels is supported by the plurality of horizontal supports.

4. The agricultural apparatus of claim 1 wherein:
    an upper perimeter edge of each vessel is folded to provide a lip.

5. The agricultural apparatus of claim 3 wherein:
    an upper perimeter edge of each vessel is folded to provide a lip.

6. The agricultural apparatus of claim 1 wherein:
    each vessel further comprises a liquid absorbent layer located on the bottom panel.

7. The agricultural apparatus of claim 3 wherein:
    each vessel further comprises a liquid absorbent layer located on the bottom panel.

8. The agricultural apparatus of claim 1 wherein:
    each vessel further comprises at least one vent hole.

9. The agricultural apparatus of claim 3 wherein:
    each vessel further comprises at least one vent hole.

10. The agricultural apparatus of claim 1 wherein:
    said plurality of vessels is supported by the plurality of horizontal supports and attached to said horizontal supports via clips.

11. The agricultural apparatus of claim 1 wherein:
    said clips are L-shaped.

12. The agricultural apparatus of claim 1 further comprising:
    a base that holds the support structure in an upright position.

13. The agricultural apparatus of claim 12 wherein:
    said base is a floating base.

14. The agricultural apparatus of claim 1 wherein:
    said plurality of vessels are arranged in a circular configuration within the support structure.

15. The agricultural apparatus of claim 1 wherein:
    said support structure and plurality of vessels are arranged in a T-shaped configuration.

16. The agricultural apparatus of claim 1 wherein:
    said support structure and plurality of vessels are arranged in an H-shaped configuration.

17. The agricultural apparatus of claim 1 further comprising:
    a roof cover to protect plants contained within the vessels from direct sunlight.

18. The agricultural apparatus of claim 17 wherein:
    said roof cover is reflective to protect plants contained within the vessels from direct sunlight.

19. The agricultural apparatus of claim 2 wherein:
    said vertical supports are size adjustable; and
    said horizontal supports are size adjustable.

20. The agricultural apparatus of claim 1 wherein:
    each of said plurality of vessels is size adjustable.

21. The agricultural apparatus of claim 1 further comprising:
    an exterior cover to protect plants contained within the vessels.

* * * * *